(12) United States Patent
Stradinger

(10) Patent No.: US 8,736,285 B2
(45) Date of Patent: May 27, 2014

(54) HIGH TEMPERATURE POSITION SENSOR

(75) Inventor: Jay Stradinger, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 532 days.

(21) Appl. No.: 13/152,957

(22) Filed: Jun. 3, 2011

(65) Prior Publication Data

US 2012/0306513 A1    Dec. 6, 2012

(51) Int. Cl.
*G01R 27/08* (2006.01)

(52) U.S. Cl.
USPC .......................... 324/691; 324/723

(58) Field of Classification Search
USPC ................. 324/691, 723
See application file for complete search history.

(56) References Cited

U.S. PATENT DOCUMENTS

| | | | |
|---|---|---|---|
| 2,492,429 A | 12/1949 | John | |
| 3,337,789 A | 8/1967 | Ono et al. | |
| 4,598,355 A | 7/1986 | Shepler et al. | |
| 4,719,795 A | 1/1988 | Eitoku et al. | |
| 5,117,625 A | 6/1992 | McArthur et al. | |
| 5,590,681 A | 1/1997 | Schaefer et al. | |
| 6,401,446 B1 | 6/2002 | Gibbons | |
| 6,638,029 B2 | 10/2003 | Kharsa | |
| 6,838,973 B2 | 1/2005 | Schweinfurth | |
| 6,956,384 B1 * | 10/2005 | Cha et al. | 324/691 |
| 7,300,494 B2 | 11/2007 | Schwalm et al. | |
| 7,370,672 B2 | 5/2008 | Lecea et al. | |
| 2002/0030666 A1 | 3/2002 | Philipp | |
| 2005/0092308 A1 | 5/2005 | Tsokonas | |
| 2009/0324438 A1 | 12/2009 | Veilleux, Jr. | |
| 2010/0192593 A1 | 8/2010 | Brown et al. | |

OTHER PUBLICATIONS

Search Report and Preliminary Opinion, dated Feb. 26, 2013, for French Application No. 1255069, 7 pages.

* cited by examiner

*Primary Examiner* — Amy He
(74) *Attorney, Agent, or Firm* — Kinney Lange, P.A.

(57) ABSTRACT

A position sensor comprises first and second stationary poles with first and second electrodes, and a reference pole positioned therebetween. The reference pole is coupled to a shaft, and includes a semi-metal via that forms a conducting path between the first and second electrodes. The shaft positions the reference pole between the first and second stationary poles, and a resistance of the conducting path varies with a position of the shaft.

25 Claims, 4 Drawing Sheets

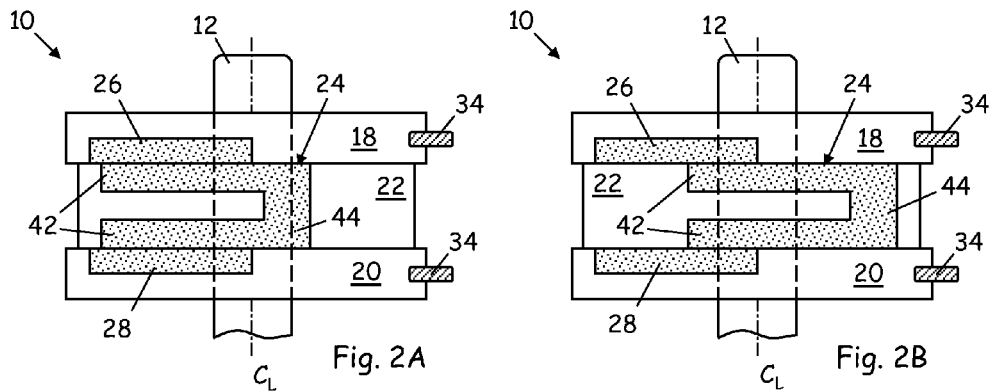
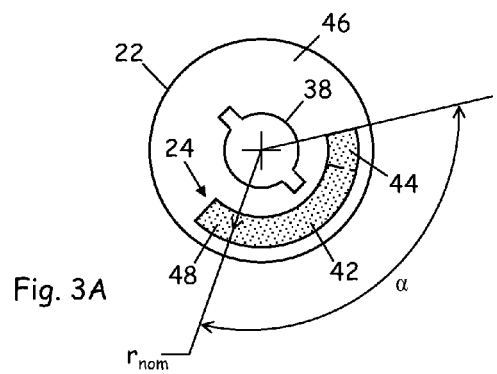
Fig. 3A
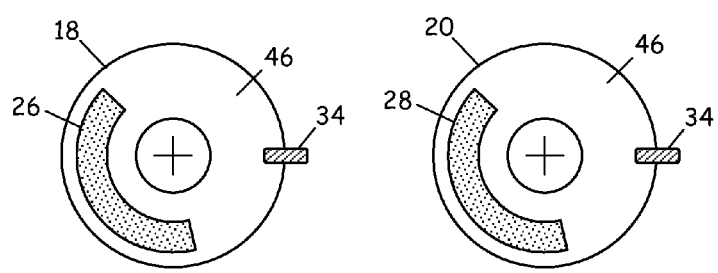
Fig. 3B

HIGH TEMPERATURE POSITION SENSOR

BACKGROUND

This invention relates generally to valves and valve systems, and specifically to position sensors for high-temperature valves and related flow control devices. In particular, the invention concerns a direct-feedback position sensor for valve components exposed to high operating temperatures, including bleed valves for rotary compressors, gas turbine engines and other turbomachinery.

Turbine engines provide efficient, reliable power for a wide range of industrial applications, including aviation, power generation, and commercial heating and cooling. Gas turbine engines (or combustion turbines) are built around a power core comprising compressor, combustor and turbine sections, arranged in flow series with an upstream inlet and downstream exhaust. The compressor compresses air from the inlet, which is mixed with fuel in the combustor and ignited to generate hot combustion gas. The turbine section extracts energy from the expanding combustion gas, and drives the compressor via a common shaft. Energy is delivered in the form of rotational energy in the shaft, reactive thrust from the exhaust, or both.

Large-scale gas turbine engines typically include a number of different compressor and turbine sections, which are arranged into coaxially nested spools. The spools operate at different pressures and temperatures, and rotate at different speeds. The individual compressor and turbine sections are further divided into a number of stages, which are formed of alternating rows of rotor blade and stator vane airfoils. The airfoils are shaped to turn, accelerate and compress the gas, and to generate lift for conversion to rotational energy in the turbine.

In ground-based industrial applications, the turbine shaft is coupled to an electrical generator or other external load. In aviation applications, the compressor is typically coupled to a propeller, propulsion fan or lift rotor, with or without a gearbox to control rotational speed. In jet engine applications, the compressor also provides bleed air for environmental functions including cabin pressurization and temperature control, and for accessory systems such as de-icing and other pneumatics such as airflow through heat exchangers.

Bleed air systems are subject to constantly changing operational demands, requiring precise pressure, temperature and flow control because overall engine efficiency depends on the engine compression ratio. Moreover, there is a continual motivation to raise operating temperatures and pressures, increasing thermal stress on bleed valves and other flow control components mounted to the compressor casing, or in other locations along the core gas path.

SUMMARY

A position sensor comprises first and second stationary poles with first and second electrodes, and a reference pole positioned between the two stationary poles. The reference pole includes a semi-metal via that forms a conducting path between the first and second electrodes.

The reference pole is coupled to a shaft. The shaft positions the reference pole between the two stationary poles, and the resistance of the conducting path varies with the position of the shaft.

BRIEF DESCRIPTION OF THE DRAWINGS

FIG. 2A is a cross-sectional view of a pole configuration for the position sensor.

FIG. 2B is a cross-sectional view of the pole configuration, with the reference pole in an alternate position.

FIG. 3A is an axial view of a reference pole.

FIG. 3B is an axial view of first and second stationary poles.

DETAILED DESCRIPTION

Figure 1:
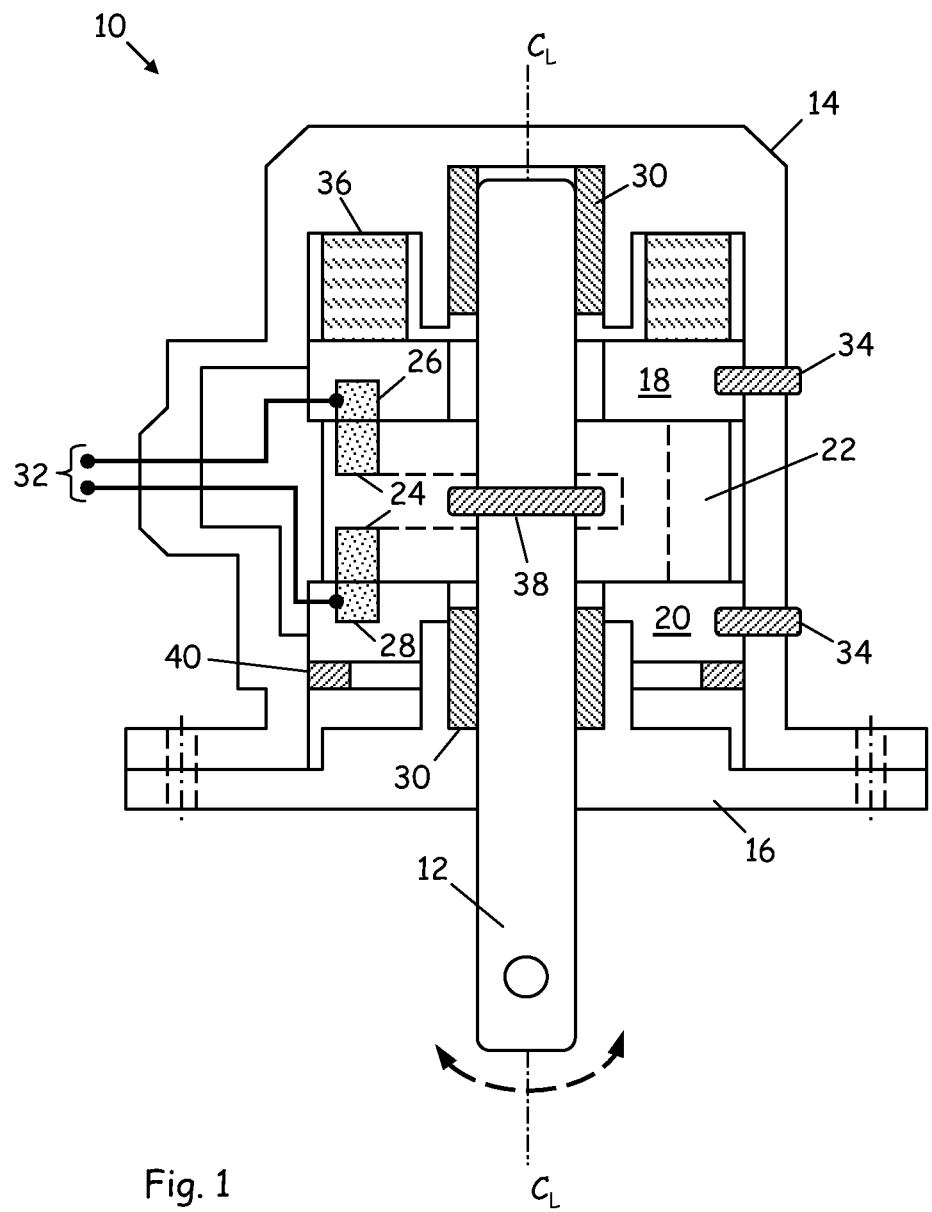
FIG. 1 is a cross-sectional view of a position sensor, in a rotary shaft embodiment.

FIG. 1 is a cross-sectional view of position sensor 10 for shaft 12, in a rotary embodiment. Position sensor (or indicator) 10 comprises outer cover or housing 14 with lower plate 16, stationary poles 18 and 20, and reference pole 22. Reference pole 22 comprises conducting via 24, which forms an electrically conducting path (dashed lines) between electrodes 26 and 28 of stationary poles 18 and 20, respectively.

Shaft 12 comprises a spindle or armature rotationally mounted within housing 14 on bushings 30, extending through lower plate 16 to a ball valve, butterfly valve, spool valve or other flow control element. Shaft 12 rotates about axis (centerline) $C_L$ to position reference pole 22 at an angle between stationary poles 18 and 20, so that the length and resistance of the conducting path vary according to the angular position of shaft 12.

The shaft position is measured as a function of the resistance across sense wires 32, which are connected to stationary electrodes 26 and 28. To provide accurate position measurements at high operating temperatures, poles 18, 20 and 22 are formed of a high temperature insulating matrix material such as a ceramic, and conducting via 24 is formed of a high-temperature semi-metal material such as graphite, which conducts electricity but has relatively high resistivity (as compared to a metal) at operating temperatures up to at least 650° F. (or 343° C.).

Bushings 30 are also formed of a high-temperature material such as graphite or ceramic, or from a high-temperature graphite-compatible metal or metal alloy. Shaft 12 is formed of a graphite-compatible metal or metal alloy, for example titanium, titanium alloy, nickel-chromium superalloy, or a graphite-compatible stainless steel. Housing 14, bottom plate 16 and the other components of position sensor 10 are formed of similar high-temperature, graphite-compatible materials. In embodiments with graphite components, non graphite-compatible materials such as aluminum are typically not used, in order to avoid corrosion and other electrochemical effects.

Stationary poles 18 and 20 are secured by anti-rotation (locking) pins 34, and biased against opposing surfaces of reference pole 22 using a wave spring or similar bias element 36. Reference pole 22 is rotationally coupled to shaft 12 via key 38, and co-rotates with shaft 12 about axis (centerline) $C_L$. Retention (locking) ring 40 supports the pole assembly against bias element 36, which urges stationary poles 18 and 20 against reference pole 22 to maintain electrical contact between conducting via 24 and stationary electrodes 26 and 28.

Sense wires 32 are connected to electrodes 26 and 28 by sintering or brazing, by soldering sense wires 32 to a plated-on conducting material such as copper, or by direct physical contact using a compression or spring element. The resistance across reference pole 22 and conducting via 24 is measured by applying a current through stationary poles 18 and 20, measuring the voltage drop across sense wires 32, and correcting for offset, bias and temperature-dependent effects.

For operating temperatures up to 650° F. (343° C.), a heat-resistant wiring such as Mil-W-25038 may be used, and the other components of position sensor 10, including stationary poles 18 and 20, reference pole 22, conducting via 24, and electrodes 26 and 28, will function indefinitely at this temperature. In addition, bushings 30, anti-rotation pins 34, bias element 36, shaft key 38 and retention ring 40 are designed to maintain electrical contact between conducting via 24 and electrodes 26 and 28 under vibratory loads in excess of 20G acceleration, including vibratory acceleration loads up to 22G and above.

Position sensor 10 thus provides direct, continuous position feedback for bleed valves and other shaft-driven flow control components subject to hostile, high temperature environments. This solves a current problem with valve position monitoring (or electrical position feedback) during operation of high temperature pneumatic bleed valves and other flow-control components on jet engines, and in other combustion turbine applications where cooling may be limited, and shielding too costly or bulky to be practical.

Other position-sensing devices such as rotary variable differential transformers (RVDTs or RVTs), resolvers, and potentiometers are heavier and more costly, and require external cooling or shielding (or both) to reduce the operating temperature of the sensor below an effective ceiling of about 350° F. (177° C.). Switches are also used, but discrete switch-based devices do not sense intermediate (i.e., continuous) shaft positions, and may also require shielding or cooling to protect sensitive electromechanical components.

Absent direct and continuous shaft position feedback, indirect "downstream" pressure and temperature measurements must be used to determine the flow rate, and the actual valve position must be inferred from these measurements. Because the response time is slower, these techniques are inherently subject to inaccuracy and instability effects, including overshoot and resulting oscillation of the control variables.

Position sensor 10, in contrast, is built from high-temperature components that are mechanically reliable at temperatures up to at least 650° F. (343° C.), and when subject to vibrations and related mechanical stress conditions typical of combustion turbine and jet engine operation. In addition, position sensor 10 has only one moving component (that is, reference pole 22, coupled to shaft 12), and this component does not have any external electrical connections. The external connections are made to electrodes 26 and 28 on stationary poles 18 and 20, increasing reliability by reducing stress and wear on the connections to sense wires 32.

Position sensor 10 also utilizes high-temperature semimetals such as graphite, which are stable against oxidation in a "chemical regime" below about 930° F. (500° C.). In addition, the ceramic matrix materials used in the pole pieces are structurally stable to temperatures well above 1000° F. (538° C.). Using similar high-temperature materials to insulate sense wires 32, position sensor 10 can thus be designed for reliable operation at temperatures up to about 800-900° F. (425-480° C.). Other, higher-temperature semi-metal or met-alloid components such as arsenic and antimony-based materials can be used at temperatures up to and above 1150° F. (620° C.), which may be reached in compressor components for high-performance aircraft, and under peak operating demands, e.g., sea-level takeoff at ambient temperatures above 100° F. (38° C.).

FIG. 2A is a cross-sectional view of a pole configuration for position sensor 10. Reference pole 22 is positioned between stationary (fixed) poles 18 and 20, with conducting via 24 forming a relatively short (low resistance) conducting path between stationary electrodes 26 and 28.

Conducting via 24 comprises two horizontal contact (or "leg") elements 42, and a vertical bridge element 44. Contact elements (or portions) 42 extend in a generally parallel sense along the opposite surfaces of reference pole 22, in electrical contact with electrodes 26 and 28 on stationary poles 18 and 20, respectively. Bridge element (or portion) 44 extends perpendicularly to contact elements 42, across the opposing surfaces of reference pole 22, forming an electrical connection between contact elements 42 to complete the conducting pathway between stationary electrodes 26 and 28.

Stationary poles 18 and 20 comprise an insulating matrix material, such as a ceramic, and stationary electrodes 26 and 28 are formed on or embedded in the insulating matrix. As shown in FIG. 2A, stationary electrode 26 is positioned on the bottom (lower) surface of first stationary pole 18, in electrical contact with upper contact element 42 of conducting via 24, on the top surface of reference pole 22. Stationary electrode 28 is positioned on the top (upper) surface of second stationary pole 20, in electrical contact with bottom contact element 42 of conducting via 24 on the lower surface of reference pole 22.

Stationary poles 18 and 20 are fixed in position by anti-rotation pins 34, while reference pole 22 co-rotates with shaft 12 about axis CL. The length of the conducting path between stationary electrodes 26 and 28 thus depends on the rotational angle of shaft 12, and the corresponding angular position of reference pole 22 between stationary poles 18 and 20. As shown in FIG. 2A, the conducting pathlength is relatively short in this particular position, corresponding to a shaft angle at which the resistance across stationary electrodes 26 and 28 is at or near a minimum.

FIG. 2B is a cross-sectional view of the pole configuration of FIG. 2A, with reference pole 22 in an alternate position. In this position, conducting via 24 forms a relatively long (high resistance) conducting path between stationary electrodes 26 and 28.

As shown in FIG. 2B, shaft 12 has rotated to reposition reference pole 22 and via 24, increasing the conducting pathlength between stationary poles 18 and 20. This corresponds to a shaft angle at which the resistance across stationary electrodes 26 and 28 is at or near a maximum.

Depending on configuration, the short pathlength (low resistance) and long pathlength (high resistance) positions of FIGS. 2A and 2B may correspond to either minimum or maximum flow positions, for example open and closed positions for a 90° valve. Alternatively, the minimum and maximum resistance values (pathlengths) may correspond to different valve or flow conditions, based on a rotation or "clocking" of the valve stem, or in a 180° or a 360° valve with a greater angular range of motion.

FIG. 3A is an axial view of reference pole 22. Reference pole 22 comprises conducting via 24 and insulating matrix 46. In this embodiment, reference pole 22 has a substantially disc-shaped or torroidal form. Contact elements 42 of conducting via 24 form arcuate contact elements on the opposites sides of reference pole 22. Bridge element 44 forms an electrical connection between contact elements 42, extending perpendicularly through insulating matrix 46. Shaft key 38 couples reference pole 22 to shaft 12 (see FIG. 1).

Conducting via 24 is formed of a high-temperature conducting material with relatively high resistivity per unit volume, for example graphite, which is an allotrope of carbon with semi-metal properties as described above. Insulating matrix 46 is formed of ceramic, or another electrical insulator with high-temperature structural stability.

In one embodiment, conducting via 24 is formed of graphite and potted in a ceramic slurry, which can be machined in the "green" state to form reference pole 22 into the desired disc or torus shape, then fired to harden insulating matrix 46 and lock the carbon graphite insert into place. Shaft key 38 can either be potted with conducting via 24 and fired along with the ceramic matrix, or inserted during later assembly.

The ceramic slurry is relatively soft in the unfired state, allowing shaping with normal steel tooling. Depending on desired surface properties, additional machining may be required after firing, for example using diamond-tip cutting and milling tools to maintain surface tolerances in the 0.1 micron range (about 4 millionths of an inch).

The relatively high resistivity of conducting via 24 provides greater sensitivity to shaft position than would be possible with a metal (low resistivity) material, because the resistance of a semi-metal increases more quickly with pathlength. In particular, electrical resistivity ER (or ρ) is determined from cross sectional area A, resistance R and length L:

$$\rho = \frac{AR}{L}. \qquad [1]$$

The conducting length L of contact element 42 depends on the position of contact region 48 with the adjacent (stationary) electrode, which in turn depends on the shaft position. For rotary butterfly and ball valve applications, the typical rotational range between open and closed positions is about 90°, for example 88° to 92°, or 86° to 94°. In these embodiments, arcuate contact element 42 extends for a corresponding angular range α of between 90° and 180°, for example about 110°, or between 120° and 150°.

Inverting Equation 1, the contribution of conducting length L to resistance R is:

$$R = \rho \frac{L}{A}. \qquad [2]$$

In one particular embodiment, cross-sectional area A is about 0.1×0.1 in² (6.5 mm²), and the nominal (or average) arc radius $r_{nom}$ is about 0.375 in (9.5 mm), as shown in FIG. 3A. In this embodiment, a 110° arc length corresponds to a nominal length of about 0.72 in (18.3 mm), and a 90° rotation corresponds to change in pathlength L of about 0.59 in (15.0 mm).

Graphite has a nominal resistivity ρ of 0.0005413 ohm-inch (1375 μΩ-cm). For two arcuate connecting elements 42, this corresponds to a total resistance R of about 0.078 ohm over the full range of motion with α=110° (FIG. 3A), and a change in resistance R of about 0.064 ohm for a 90° rotation. The sensitivity is substantially linear over these ranges; that is, the change in resistance varies linearly with the change in shaft position.

These particular values, however, are merely representative, as the resistivity of graphite (and other semi-metal or metalloid allotropes) may vary by up to a factor of ten or more, depending on manufacturing process, plane orientation, and lattice defects. In particular, the resistivity of graphite is lower for pure samples, and increases with impurities and defects. This allows the resistivity of conducting via 24 to be selected based on application, for example within a range of about 0.0002 ohm-inch to about 0.0006 ohm-inch (about 500 to 1500 μΩ-cm) for commercially available "pure" graphite samples (both natural and manufactured), or from about 0.0004 ohm-inch to about 0.004 ohm-inch (about 1-10 mΩ-cm) or higher for samples with more impurities and defects.

In addition, the length and cross sectional areas of arcuate contact elements 42 also vary depending on shaft size and other considerations, and the angular range of motion may be less than 90°, or greater than 90°. Typically, therefore, the change in resistivity with shaft position varies over a range on the order of a few thousandths of an ohm up to one ohm or more.

FIG. 3B is an axial view of first and second stationary poles 18 and 20. In this embodiment, insulating matrix portions 46 have substantially circular or disc-shaped (torroidal) form, corresponding to the shape of reference pole 22 in FIG. 3A. Stationary electrodes 26 and 28 form arcuate contact elements on the surfaces of stationary poles 18 and 20, with angular size similar to that of connecting elements 42 on conducting via 24.

Stationary poles 18 and 20 are also formed by a similar process to that of reference pole 22, for example by potting stationary electrodes 26 and 28 in a ceramic matrix and machining to form insulating matrix 46 into the desired shape. Anti-rotation (locking) pins 34 can either be potted and fired along with the ceramic matrix material, or inserted during later assembly.

In one particular embodiment, stationary electrodes 26 and 28 are formed of a high-temperature conducting material with relatively high resistivity, for example graphite or another semi-metal material or semi-metal allotrope, as described above for conducting via 24 of reference pole 22. In these embodiments, electrodes 26 and 28 may also contribute to the change in resistance across stationary poles 18 and 20, as described above for graphite or semi-metal conducting via 24.

Because stationary poles 18 and 20 do not rotate, however, it is also possible for the pole and electrode geometry to vary from that of reference pole 22. In addition, stationary electrodes 26 and 28 may be formed of a conducting metal with relatively low resistivity, so that the change in resistance with shaft position is substantially due to the composition and geometry of conducting via 24.

Figure 4:
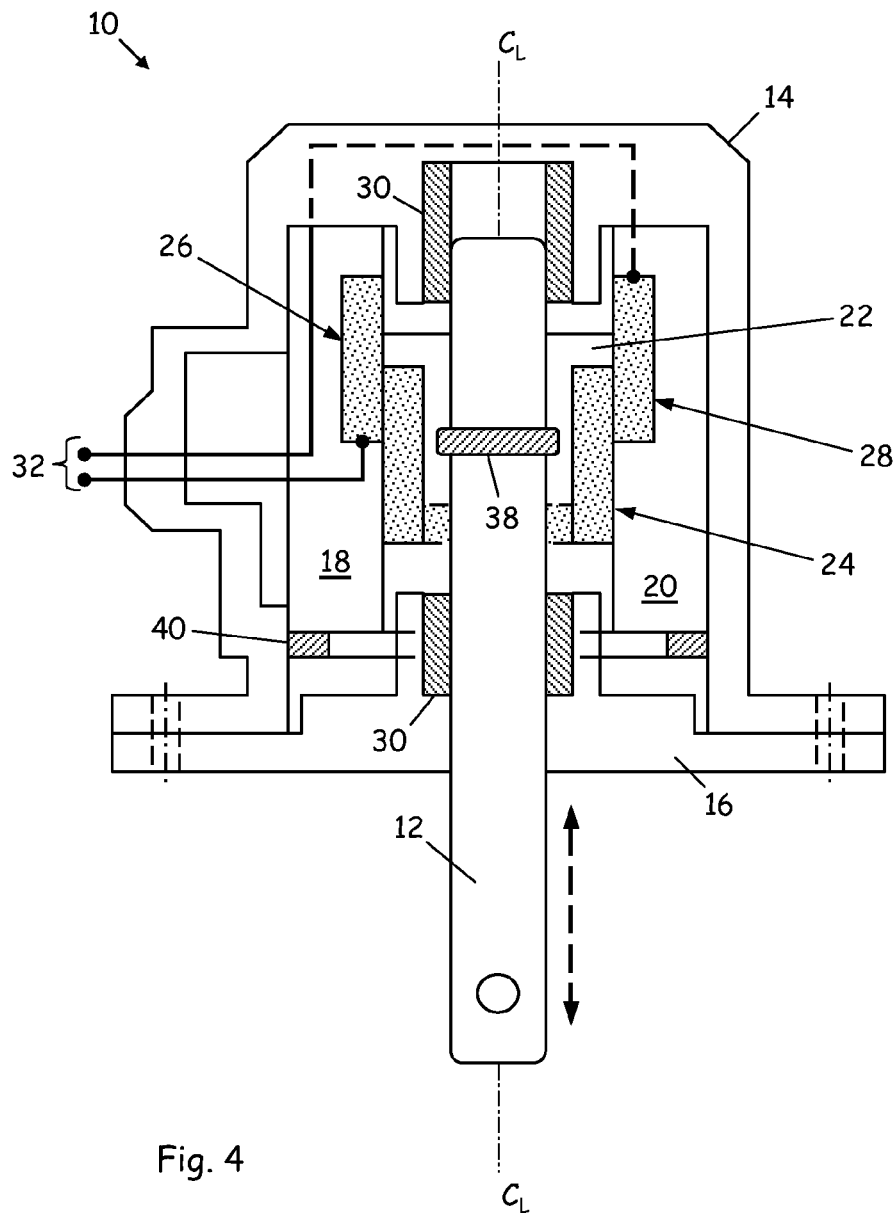
FIG. 4 is a cross-sectional view of the position sensor, in a translating shaft embodiment.

FIG. 4 is a cross-sectional view of position sensor 10 for shaft 12, in a translating shaft embodiment. In this embodiment, shaft 12 translates axially along centerline $C_L$, and is coupled to reference pole 22 via key 38 so that reference pole 22 and conducting via 24 move along with shaft 12. Stationary poles 18 and 20 are axially aligned on either side of shaft 12, so that the conducting pathlength between electrodes 26 and 28 varies with the axial shaft position.

In other respects, operation of position sensor 10 is similar, with reference pole 22 biased against stationary poles 18 and 20 to maintaining electrical contact between conducting via 24 and stationary electrodes 26 and 28, respectively. The materials and manufacture of the individual sensor components are also similar, so that position sensor 10 provides high-temperature performance in both rotational and axially translating shaft embodiments, with similar reliability under harsh operating conditions and when subject to vibratory stress.

Figure 5A:
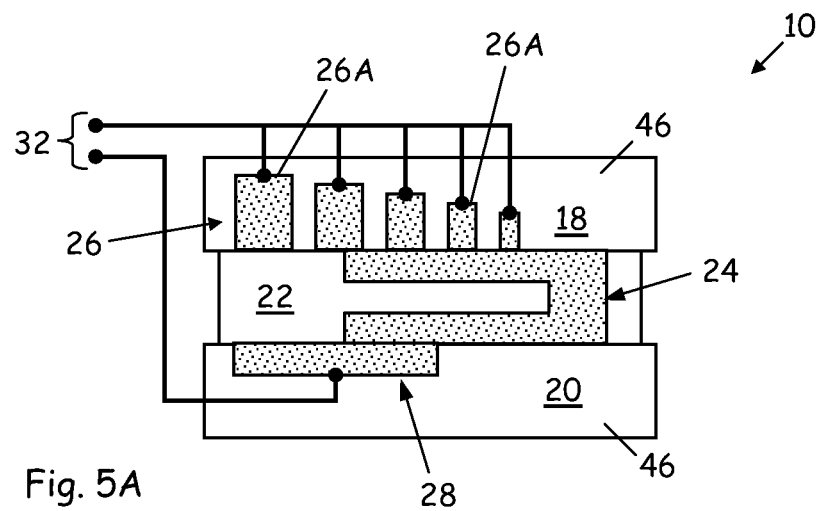
FIG. 5A is a cross-sectional view of a pole configuration with a segmented stationary electrode.

FIG. 5A is a cross-sectional view of position sensor 10, showing stationary pole 18 with a segmented electrode 26. In this embodiment, stationary electrode 26 is divided into a plurality of individual segments or sections 26A, which are separated by insulating (ceramic) matrix 46, or another insulating material such as mica.

Alternatively, second stationary electrode 28 is segmented, or both first stationary electrode 26 and second stationary electrode 28 are segmented. Individual signals from each electrode segment 26A may also be ganged together in a single sense wire 32, or distributed over several different sense wires 32.

Segments 26A of stationary electrode 26 have different cross-sectional areas (parallel to the contact surface of stationary pole 18), and different thickness or height (perpendicular to the contact surface of stationary pole 18). The thickness and cross-sectional areas determine the resistance, as shown in Equations 1 and 2, above. This provides an alternate technique for sensing the shaft position, as reflected by the relative position of reference pole 22 and conducting via 24 with respect to stationary electrodes 26 and 28. In particular, segmented electrode designs do not in general have linear response; that is, the resistance across stationary poles 18 and 20 may vary non-linearly with changes in the shaft position.

Figure 5B:
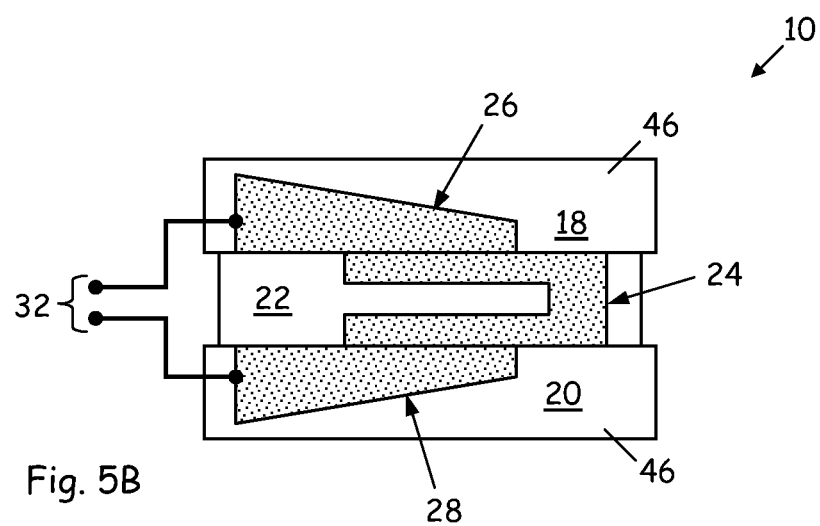
FIG. 5B is a cross-sectional view of a pole configuration with wedge-shaped stationary electrodes.

FIG. 5B is a cross-sectional view of position sensor 10, showing stationary poles 18 and 20 with wedge-shaped electrodes 26 and 28. In this embodiment, the thickness or perpendicular height of one or both of stationary electrodes 26 and 28 varies continuously across the surfaces of stationary poles 18 and 20.

As with the discrete (segmented) electrode embodiment of FIG. 5A, the thickness variation of electrodes of FIG. 5B may be selected to provide position sensor 10 with a nonlinear response to shaft position. These embodiments are applicable to both rotary and axially translating shafts, in order to provide increased sensitivity over particular ranges of motion. In some embodiments, for example, sensitivity is increased for small variations from the minimum or maximum resistance values, corresponding to minimum or maximum flow conditions. In other embodiments the sensitivity is increased for an intermediate flow range.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A position sensor comprising:
 a first stationary pole comprising a first electrode;
 a second stationary pole comprising a second electrode;
 a reference pole positioned between the first and second stationary poles, the reference pole comprising a semi-metal via, wherein the semi-metal via forms a conducting path between the first and second electrodes; and
 a shaft coupled to the reference pole, wherein the shaft positions the reference pole between the first and second stationary poles such that a resistance of the conducting path varies with a position of the shaft.

2. The position sensor of claim 1, wherein the semi-metal via conducts current at operating temperatures up to 650° F. (or 343° C.).

3. The position sensor of claim 1, wherein the semi-metal via comprises graphite.

4. The position sensor of claim 1, wherein the reference pole comprises a ceramic matrix and the semi-metal via is embedded in the ceramic matrix.

5. The position sensor of claim 1, wherein the first stationary pole comprises a ceramic matrix and the first electrode comprises graphite embedded in the ceramic matrix.

6. The position sensor of claim 5, wherein a thickness of the first electrode varies along a surface of the first stationary pole, such that the resistance of the conducting path varies with the position of the shaft and the thickness of the first electrode.

7. The position sensor of claim 5, wherein the second electrode is divided into a plurality of sections having different cross sectional areas and separated by insulating materials, such that the resistance of the conducting path varies with the position of the shaft and the different cross-sectional areas of the sections.

8. The position sensor of claim 1, wherein the semi-metal via comprises a first portion in electrical contact with the first electrode, a second portion parallel to the first portion and in electrical contact with the second electrode, and a third portion perpendicular to the first and second portions and forming an electrical connection therebetween.

9. The position sensor of claim 8, wherein the first portion forms an arcuate contact on a first side of the reference pole, the second portion forms an arcuate contact on a second side of the reference pole, and the third portion forms a conducting bridge extending across the reference pole between the first and second arcuate contacts.

10. The position sensor of claim 8, further comprising a biasing element to urge the arcuate contacts into electrical contact with the first and second electrodes.

11. The position sensor of claim 1, wherein the shaft rotates about an axis to position the reference pole at an angle between the first and second stationary poles, such that the resistance of the conducting path varies with a rotational angle of the shaft.

12. The position sensor of claim 1, wherein the shaft translates along an axis to position the reference pole between the first and second stationary poles, such that the resistance of the conducting path varies with an axial location of the shaft.

13. A high-temperature position sensor comprising:
 a first stationary pole comprising a first electrode;
 a second stationary pole comprising a second electrode;
 a reference pole comprising a graphite via, the graphite via comprising a first portion in contact with the first electrode, a second portion in contact with the second electrode, and a third portion connecting the first and second portions to form a conducting path between the first electrode and the second electrode; and
 a shaft coupled to the reference pole, wherein the shaft positions the reference pole between the first and second stationary poles such that a resistance of the conducting path varies based on a position of the shaft.

14. The high-temperature position sensor of claim 13, wherein the reference pole comprises a ceramic matrix and the graphite via is embedded in the ceramic matrix.

15. The high-temperature position sensor of claim 14, wherein the first and second stationary poles comprise ceramic matrix materials and the first and second electrodes comprise graphite contacts embedded in the ceramic matrix materials.

16. The high-temperature position sensor of claim 14, wherein the shaft positions the reference pole at an axial location between the first and second stationary poles and the resistance of the conducting path varies with the axial location.

17. The high-temperature position sensor of claim 13, wherein the shaft is rotationally coupled to the reference pole and the resistance of the conducting path varies with a rotational angle of the shaft.

18. The high-temperature position sensor of claim 17, wherein the first portion of the graphite via comprises an arcuate contact on a first side of the reference pole and the second portion of the graphite via comprises an arcuate contact on a second side of the reference pole.

19. The position sensor of claim 13, wherein the resistance of the conducting path varies linearly with the position of the shaft.

20. The position sensor of claim 13, wherein a thickness of the first electrode varies along a surface of the first stationary pole, such that the resistance of the conducting path varies non-linearly with the position of the shaft.

21. A method for sensing position, the method comprising:
positioning a reference pole between first and second stationary poles with a shaft, the reference pole having a semi-metal via;
forming a conducting path along the semi-metal via between a first electrode on the first stationary pole and a second electrode on the second stationary pole;
repositioning the reference pole with the shaft, such that a resistance of the conducting path varies based on a position of the shaft; and
measuring the position of the shaft, based on the resistance.

22. The method of claim 21, further comprising performing the method at an operating temperature of the reference pole up to 650° F. (or 343° C.).

23. The method of claim 21, wherein the reference pole is formed from a ceramic matrix material and the semi-metal via is embedded in the ceramic matrix material.

24. The method of claim 23, wherein the semi-metal via is formed from graphite.

25. The method of claim 21, wherein the semi-metal via comprises:
first and second contact portions, the contact portions extending along opposing surfaces of the reference pole; and
a bridge portion connecting the contact portions, the bridge portion extending perpendicularly to the contact portions, across the opposing surfaces of the reference pole.

* * * * *